United States Patent [19]

Asada et al.

[11] Patent Number: 4,985,011
[45] Date of Patent: Jan. 15, 1991

[54] AUTOMATIC TRANSMISSION

[75] Inventors: Toshiyuki Asada; Yasuhiko Higashiyama; Yasunori Nakawaki; Toshitake Suzuki; Akiharu Abe; Naoki Moriguchi, all of Susono, Japan

[73] Assignee: Toyota Jidosha Kabushiki Kaisha, Toyota, Japan

[21] Appl. No.: 475,304

[22] Filed: Feb. 5, 1990

[30] Foreign Application Priority Data

| Feb. 3, 1989 | [JP] | Japan | 1-25319 |
| Feb. 3, 1989 | [JP] | Japan | 1-25320 |
| Feb. 3, 1989 | [JP] | Japan | 1-25321 |
| Feb. 3, 1989 | [JP] | Japan | 1-25322 |
| Mar. 10, 1989 | [JP] | Japan | 1-58406 |
| Mar. 15, 1989 | [JP] | Japan | 1-63385 |
| Apr. 27, 1989 | [JP] | Japan | 1-108183 |
| May 10, 1989 | [JP] | Japan | 1-116797 |

[51] Int. Cl.$^5$ ............................................. F16H 57/10
[52] U.S. Cl. ................................... 475/278; 475/277; 475/288; 475/284; 475/285
[58] Field of Search ............... 475/276, 277, 278, 284, 475/285, 288

[56] References Cited

U.S. PATENT DOCUMENTS

| 2,764,904 | 10/1956 | Kummich | 475/285 |
| 4,233,861 | 1/1980 | Gaus et al. | 74/763 |
| 4,660,439 | 4/1987 | Hiraiwa | 74/763 |
| 4,884,471 | 12/1989 | Daggett et al. | 475/285 |

FOREIGN PATENT DOCUMENTS 0019860 2/1977 Japan .................................. 475/285

Primary Examiner—Dirk Wright
Attorney, Agent, or Firm—Oblon, Spivak, McClelland, Maier & Neustadt

[57] ABSTRACT

An automatic transmission including gear trains, which are constructed of at least three planetary gear sets each having three rotating members. A first clutch is arranged closer to an input shaft than the first planetary gear set for connecting any one of the rotating members of the first planetary gear set arranged adjacent to the input shaft. A second clutch is also arranged closer to the input shaft than the first planetary gear set for connecting another of the rotating members of the first planetary gear set and the input shaft. A third clutch is interposed between the first planetary gear set and the second planetary gear set for connecting any one of the rotating members of the second planetary gear set arranged at the opposite side to the input shaft across the first planetary gear set and the any one or the another of the rotating members of either one of the first clutch and the second clutch or the first planetary gear set. A fourth clutch is interposed between the first planetary gear set and the second planetary gear set for connecting the another of the rotating members of the second planetary gear set and the any one or the another of the rotating members of the first clutch, the second clutch or the first planetary gear set.

35 Claims, 9 Drawing Sheets

AUTOMATIC TRANSMISSION

BACKGROUND OF THE INVENTION

1. Field of the Invention

The present invention relates to an automatic transmission for an automobile and, more particularly, to an automatic transmission including a gear train composed of a plurality of planetary gear sets.

2. Description of the Prior Art

As is well known in the prior art, the gear trains of an automatic transmission are constructed of a plurality of planetary gear sets of single-pinion type, double-pinion type or Ravignawx type. For the larger number of the planetary gear sets to be used, the number of settable gears is accordingly increased the more to improve the power performance of the vehicle and the accelerability at the start, whereas the structure is accordingly complicated to raise the weight and the production cost. For the smaller number of the planetary gear sets to be used, on the contrary, the structure is simplified, although the number of settable gears is decreased, so that the lighter product can be obtained at the lower cost. In the prior art, therefore, various endeavors have been made to satisfy the contradictory requirements for the increase in the number of the gears and for the simplification of the structure. In recent years, there has been proposed a gear train which can set five forward gears and one reverse gear or more gears by using three planetary gear sets.

One example of the proposals is described in U.S. Pat. No. 4,233,861. The gear train is equipped with one of Ravignawx type planetary gear set and one of single-pinion type planetary gear set. The Ravignawx type planetary gear set has its one pinion gear meshing with a first large-diameter sun gear and a ring gear and its other pinion gear meshing with a second small-diameter sun gear and the former pinion gear, and these pinion gears are carried by a planetary carrier. On the other hand, the ring gear of the Ravignawx type planetary gear set is connected to the ring gear of the single-pinion type planetary gear set. The first sun gear is connected through a first clutch to an input shaft, and the carrier of the Ravignawx type planetary gear set is connected through a second clutch and a one-way clutch to the sun gear of the single-pinion type planetary gear set. There are further provided a third clutch for connecting the second sun gear and the input shaft, and a fourth clutch for connecting the carrier of the Ravignawx type planetary gear set and another input shaft. There are further provided a first brake for braking the rotations of the first sun gear, a second brake for braking the rotations of the sun gear of the single-pinion type planetary gear set, and a third brake for braking the rotations of the carrier of the Ravignawx type planetary gear set.

In the automatic transmission described in this U.S. Pat. No. 4,233,861, the aforementioned first, third and fourth cluthes are interposed between the Ravignawx type planetary gear set and the input shaft. As a result, the connecting members for connecting those clutches and the aforementioned first and second sun gears or carriers have to be elongated to raise a disadvantage that the weight is augmented. Moreover, the connecting members have to take a complicated tripple-tube structure in which three tubes are concentrically arranged. Since, furthermore, either an input shaft or a rotating member for connecting the input shaft has to be disposed around the fourth clutch, the oil passage for feeding the oil pressure to a hydraulic servo mechanism for engageing the fourth clutch or the third clutch may be complicated.

Another automatic transmission having three planetary gear sets and capable of setting at least five forward and one reverse speeds is described in U.S. Pat. No. 4,660,439. This automatic transmission includes: a first clutch arranged at the side of an input shaft for connecting the ring gear of a first planetary gear set and the input shaft; a second clutch for connecting the sun gear of the first planetary gear set and the input shaft; a third clutch arranged adjacent to the first planetary gear set for connecting the sun gear of a second planetary gear set and the second clutch; and a fourth clutch for connecting the carrier of the second planetary gear set and the second clutch. Since, however, the fourth clutch is interposed between the second planetary gear set and the third planetary gear set and since the ring gear of the second planetary gear set and the ring gear of the third planetary gear set are connected, a member for connecting those ring gears must be positioned around the fourth clutch. This positioning restricts the size of the external diameter of the fourth clutch so that the fourth clutch has to be axially elongated to retain a necessary transmission torque capacity. As a result, there arises a disadvantage that the whole length of the automatic transmission is increased. In addition to the fact that the rotating member is arranged around the fourth clutch, a quill shaft for connecting the aforementioned two ring gears and the carrier of the first planetary gear set is disposed inside of the fourth clutch. As a result, the structure of an oil passage for feeding the oil pressure to a hydraulic servo mechanism for engaging the fourth clutch may be complicated.

SUMMARY OF THE INVENTION

An object of the present invention is to provide an automatic transmission which can set at least five forward and one reverse gears by the use of at least three planetary gear sets and which has its structure simplified and small-sized.

Another object of the present invention is to provide an automatic transmission which can simplify the oil pressure supply passages to the clutch means and make rotation connecting members light.

These objects can be achieved by providing an automatic transmission including gear trains, which are constructed of at least three planetary gear sets each having three rotating members, i.e., a sun gear, a carrier and a ring gear for changing the speeds of the rotations of an input shaft and transmitting the same to an output shaft, the first and second ones of said three planetary gear sets being arranged adjacent to and at an extension of the axis of said input shaft, which transmission comprises: first clutch means arranged closer to said input shaft than said first planetary gear set for connecting any one of the rotating members of said first planetary gear set arranged adjacent to said input shaft; second clutch means arranged closer to said input shaft than said first planetary gear set for connecting another of the rotating members of said first planetary gear set and said input shaft; third clutch means interposed between said first planetary gear set and said second planetary gear set for connecting any one of the rotating members of said second planetary gear set arranged at the opposite side to said input shaft across said first planetary gear set and said any one or said another of the rotating members of either one of said first clutch means and said second clutch means or said first planetary gear set; and fourth clutch means interposed between said first planetary gear set and said second planetary gear set for connecting said another of the rotating members of said second planetary gear set and said any one or said another of the rotating members of said first clutch means, said second clutch means or said first planetary gear set.

In the present invention, the three planetary gear sets are arranged on the extending axis of the input shaft, and one of the planetary gear sets may be of the double-pinion type whereas the other two planetary gear sets may be of the single-pinion type.

In the automatic transmission of the present invention, therefore, only one rotating member for connections extends radially outside of the first planetary gear set so that the whole size of the external diameter of the automatic transmission can be prevented from being enlarged. Since, moreover, there is no rotating member for connections extends around the second clutch means and the fourth clutch means, the sizes of the external diameters of these clutch means are not especially restricted so that the necessary transmission torque capacity can be without enlarging the axial length. Furthermore, the third clutch means and the fourth clutch means are arranged close to each other, and the quill shaft for connections between those clutch means can be made short and light.

The above and further objects and features of the present invention will more appear from the following detailed description when the same is read in connection with the accompanying drawings. It is expressly understood, however, that the drawings are for the purpose of illustration only and are not intended to define the limits of the invention.

DETAILED DESCRIPTION OF THE PREFERRED EMBODIMENTS

Figure 1:
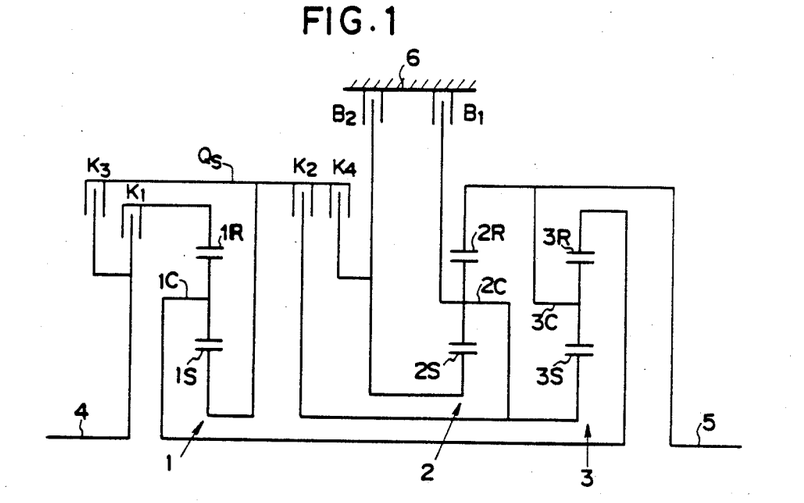
FIG. 1 is a skeleton diagram showing the principle of one embodiment of the present invention.

In FIG. 1, a gear train for setting five forward and one reverse gears is constructed of three planetary gears sets, i.e., front, center and rear planetary gear sets 1, 2 and 3 of single-pinion type. Here, the definitions of those front, center and rear are determined, assuming that an input shaft 4 is located at the front side, but are not always those determined from the mounted states on the vehicle, and their order of array do not follow their names. These planetary gear sets 1, 2 and 3 are respectively composed of sun gears 1S, 2S and 3S, ring gears 1R, 2R and 3R arranged coaxially of the sun gears, and carriers 1C, 2C and 3C for holding pinion gears meshing with those gears. The carrier 1C of the front planetary gear set 1 and the ring gear 3R of the rear planetary gear set 3 are integrally connected. The ring gear 2R of the center planetary gear set 2 and the carrier 3C of the rear planetary gear set 3 are integrally connected. The carrier 2C of the center planetary gear set 2 and the sun gear 3S of the rear planetary gear set 3 are integrally connected. The sun gear 1S of the front planetary gear set 1 is connected through a second clutch means K2 to the carrier 2C of the center planetary gear set 2 and the sun gear 3S of the rear planetary gear set 3, which in turn are connected to each other. The sun gears 1S and 2S of the front planetary gear set 1 and the center planetary gear set 2 are connected to each other through fourth clutch means K4.

The input shaft 4 is disposed at the side of the front planetary gear set 1 and is selectively connected to the ring gear 1R of the front planetary gear set 1 through first clutch means K1 acting as the so-called input clutch means. The input shaft 4 and the sun gear 1S of the front planetary gear set 1 are selectively connected through third clutch means K3 acting as the so-called input clutch means. On the contrary, an output shaft 5 is disposed at the side of the rear planetary gear set 3 and is connected to the ring gear 2R of the center planetary gear set 2 and the carrier 3C of the rear planetary gear set 3, which in turn are connected to each other.

On the other hand, the brake means for blocking the rotations of predetermined members are exemplified by first and second brake means B1 and B2. Of these, the first brake means B1 is interposed between the carrier 2C of the center planetary gear set 2 and a transmission casing (which will be shortly referred to as the "casing") for blocking the rotations of that carrier 2C and the sun gear 3S of the rear planetary gear set 3, which are connected to each other. The second brake means B2 is interposed between the sun gear 2S of the center planetary gear set 2 and the casing 6 for blocking the rotations of that sun gear 2S.

Here will be described the arrangements of the aforementioned planetary gear sets 1, 2 and 3, clutch means and brake means. The first and third clutch means K1 and K3 acting as the input clutch means are arranged at the side of the input shaft 4 with respect to the front planetary gear set 1. On the other hand, the second and fourth clutch means K2 and K4 for connecting the sun gear 2S and carrier 2C of the center planetary gear set 2, respectively, to the third clutch means K3 acting as one input clutch means are interposed between the front planetary gear set 1 and the center planetary gear set 2. Of these two clutch means K2 and K4, the fourth one K4 is arranged closer to the center planetary gear set 2 than the second one K2. Moreover, the first brake means B1 is interposed between the fourth clutch means K4 and the center planetary gear set 2, and the second brake means B2 is arranged either around the fourth clutch means K4 or between the fourth clutch means K4 and the center planetary gear set 2. As a result, there is arranged around the ring gear 1R of the front planetary gear set 1 only one quill shaft Qs for connecting the second clutch means K2 and the fourth clutch means K4 to the third clutch means K3. No quill shaft is present around the second and fourth clutch means K2 and K4.

Incidentally, the engagement means such as the aforementioned clutch means or brake means includes multi-disc clutches or brakes which are adapted to be engaged or released by hydraulic servo mechanisms used in the existing automatic transmission for the automatic transmission of the prior art. However, the engagement means should not be limited to the multi-disc components but can be suitably constructed by combining a one-way clutch with the multi-disc clutches or brakes. On the other hand, either the structure for connecting the components of the individual planetary gear sets or the structure for connecting the components of the individual planetary gear sets and the engagement means can be exemplified by connecting means such as the connecting drum or quill shaft which is adopted in the existing automatic transmission of the prior art.

The automatic transmission thus far described with reference to FIG. 1 can set five forward and one reverse gears, which can be individually established by engageing and/or releasing the aforementioned clutch means and brake means, as enumerated in Table 1. Here is Table 1, the symbol O indicates the engagements whereas the symbol X indicates the releases.

TABLE 1

|  | Clutch Means | | | | Brake Means | |
| --- | --- | --- | --- | --- | --- | --- |
|  | K1 | K2 | K3 | K4 | B1 | B2 |
| 1st | O | X | X | O | O | X |
| 2nd | O | O | X | X | O | X |
| 3rd | O | X | O | X | O | X |
| 4th | O* | O* | O* | O* | X | X |
| 5th | X | O | O | X | X | O |
| Rev | X | X | O | O | O | X |

(*):At least any three clutch means are engaged.

Figure 2A:
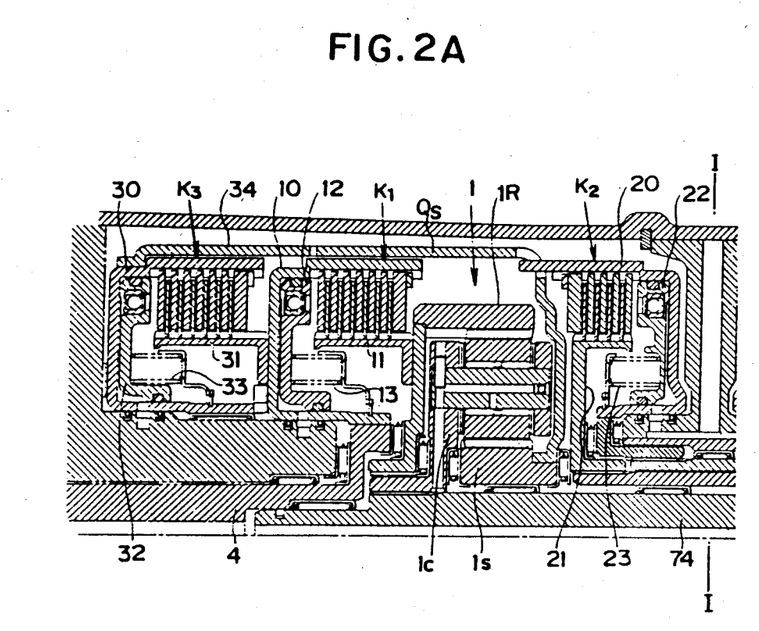
FIG. 2(A) and 2(B) are a sectional view showing another embodiment of the present invention, when jointed along line I—I, more specifically on the asis of the structure shown in FIG. 1.
Figure 2B:
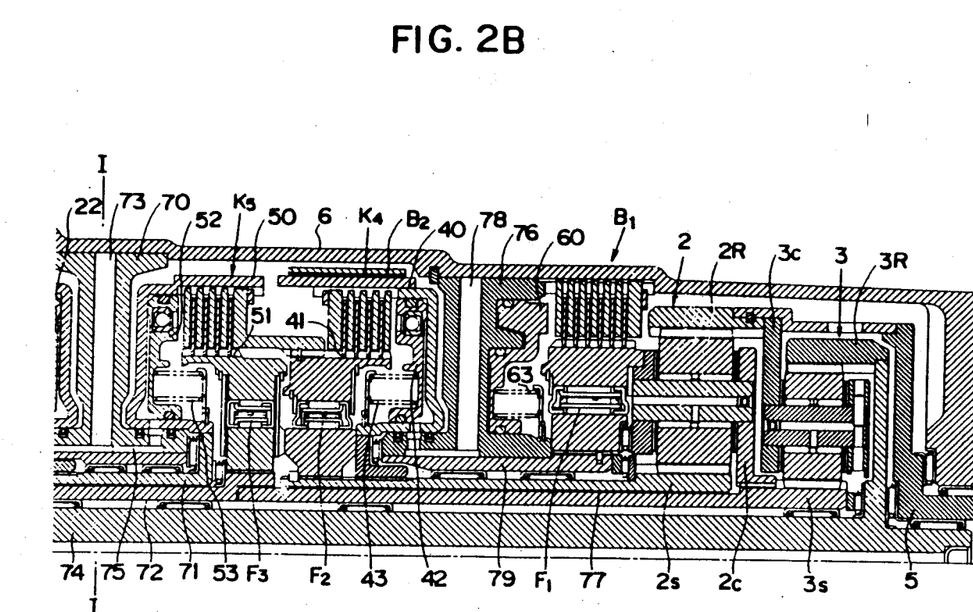

The specific structure of the automatic transmission shown in the skeleton diagram of FIG. 1 is shown in FIGS. 2(A) and 2(B). In the structure shown in FIGS. 2(A) and 2(B), another clutch means composed of a multi-disc clutch and a one-way clutch is arranged in parallel with the second clutch means K2, as will be sequentially described in the following. The input shaft 4 is connected to the output shaft (although not shown) of coupling means such as a torque converter and has its leading end connected to a clutch drum 10 of the first clutch means K1. This first clutch means K1 is engaged to transmit the torque by causing the discs and plates, which are splined to the clutch drum 10 and a clutch hub 11 integrated with the ring gear 1R of the front planetary gear set 1, to contact frictionally with each other and is released to transmit no torque by releasing the frictional contacts. For these engagements and releases, there is provided a hydraulic servo mechanism. This hydraulic servo mechanism is made to have a structure similar to that widely known in the prior art, in which a hydraulic piston 12 is arranged in the clutch drum 10 to reciprocate back and forth in the axial directions. A return spring 13 is arranged in front of the hydraulic piston 12 to move it backward. The third clutch means K3 for connecting the input shaft 4 and the sun gear 1S of the front planetary gear set 1 is also engaged, like the first clutch means K1, to transmit the torque by causing the discs and plates, which are splined to a clutch drum 30 and a clutch hub 31, to contact frictionally with each other and is released to transmit no torque by releasing the frictional contacts. The clutch hub 31 is integrated with the clutch drum 10 of the first clutch means K1, and the clutch drum 30 is integrally connected to a cylindrical connecting drum 34 which in turn is connected to the sun gear 1S of the front planetary gear set 1 while covering the first clutch means K1 and the outer surface of the front planetary gear set 1. This third clutch means K3 is engaged or released by the hydraulic servo mechanism, as will be described in the following. In the clutch drum 30, there is reciprocally fitted a hydraulic piston 32 which is moved backward by a return spring 33 disposed in front of the hydraulic piston 32.

At the opposite side of the first clutch means K1 across the front planetary gear set 1, there is arranged the second clutch means K2, which is supported by a quill shaft 71 fitted rotatably in the inner surf oface a first center support 70. Specifically, the first center support 70 is fixed on the inner surface of the casing 6. Moreover, the clutch drum 20 of the second clutch means K2 is fitted rotatably, while being held in liquidtight state, in the boss of the first center support 70 and has its leading end engaging irrotatably with the aforementioned connecting drum 34. Moreover, the clutch drum 20 is splined to the quill shaft 71 which is rotatably supported on the inner surface of the first center support 70. A clutch hub 21, which is to be connected to the clutch drum 20 by the frictional contact of the discs and the plates, is connected to a first sun gear shaft 72 which is rotatably supported on the inner surface of the aforementioned quill shaft 71. The second clutch means K2 is engaged or released by a hydraulic servo mechanism. This hydraulic servo mechanism is constructed such that a hydraulic piston 22 is reciprocally movably fitted in the clutch drum 20 and such that a return spring 23 for moving the hydraulic piston 22 backward is disposed in front of the hydraulic piston 22. The feed and discharge of the oil pressure to and from the hydraulic servo mechanism are accomplished through an oil passage 73 which extends through the first center support 70 from its outer surface.

Radially internally of the aforementioned first sun gear 72, there is disposed an intermediate shaft 74 which is coaxial with the aforementioned input shaft 4. The intermediate shaft 74 extends from the front planetary gear set 1 to the read end opposite to the input shaft 4 and has its front end connected to the carrier 1C of the aforementioned front planetary gear set 1 and its rear end connected to the ring gear 3R of the rear planetary gear set 3.

At the opposite side of the second clutch means K2 across the aforementioned first center support 70, there is arranged a fifth clutch means K5. This fifth clutch means K5 has its clutch drum 50 fitted rotatably, while being held in liquid-tight state, in the boss of the first center support 70 and connected to the aforementioned quill shaft 71. As a result, the clutch drums 20 and 50 of the second clutch means K2 and the fifth clutch means K5 are connected to each other. The fifth clutch means K5 has its disc and plate thrusted to contact frictionally with each other by means of a hydraulic piston 52, which is reciprocally movably fitted in the clutch drum 50, so that the torque may be transmitted between the clutch drum 50 and a clutch hub 51. This clutch hub 51 is integrated with the outer race of a one-way clutch F3, which in turn has its inner race connected to the aforementioned first sun gear shaft 72. In other words, the fifth clutch means K5 and the one-way clutch F3 are arrayed in series. Incidentally, the release of the fifth clutch means K5 is accomplished by moving the hydraulic piston 52 backward by a return spring 53. The feed and discharge of the oil pressure to and from the hydraulic piston 52 for actuating the fifth clutch means K5 are effected through another oil passage 75 which is formed to extend through the aforementioned first center support 70. In other words, the hydraulic piston 52 and the return spring 53 constitute together the hydraulic servo mechanism for engageing and releasing the fifth clutch means K5.

This fourth clutch means K4 opposes to the fifth clutch means K5. This fourth clutch means K4 is also composed, as its major components, like other clutch means, of a clutch drum 40, a clutch hub 41 connected to or released in a torque transmitting manner to the clutch drum 40 through discs and plates, a hydraulic piston 42, and a return spring 43. The clutch drum 40 is fitted rotatably, while being held in a liquid-tight state, in the boss of a second center support 76, which is fixed on the inner surface of the casing 6, and is connected to one end portion of a second sun gear shaft 77 which is rotatably arranged on the outer surface of the aforementioned first sun gear shaft 72. Moreover, the clutch hub 41 is integrated with the outer race of another one-way clutch F2, which in turn has its inner race splined to the second sun gear shaft 77. The oil pressure for actuating the hydraulic piston 42 is fed and discharged through an oil passage 78 which is formed to extend through the second center support 76. Incidentally, the other end of the second sun gear shaft 77 is connected to the sun gear 2S of the center planetary gear set 2. As a result, the hydraulic piston 42 and the return spring 43 constitute together the hydraulic servo mechanism for engaging and releasing the fourth clutch means K4.

Moreover, the clutch drum 40 of the fourth clutch means K4 acts as the brake drum and has its outer surfeqaceuipped with the second brake means B2 composed of a band brake.

At the opposite side of the fourth clutch means K4 across the second center support 76, there are arranged the first brake means B1 and a one-way clutch F1. The first brake means B1 is made of a multi-disc brake which has its discs splined to the leading end of the second center support 76 and its plates splined to the outer surface of the outer race of the one-way clutch F1. This one-way clutch F1 has its inner race splined to a sleeve 79 which is integrated with the second center support 76. Moreover, the carrier 2C of the center planetary gear set 2 is connected to the outer race of the one-way clutch F1. As a result, the first brake means B1 and the one-way clutch F1 are in parallel relationship with each other so that they block the rotations of the carrier 2C of the center planetary gear set 2 selectively. The first brake means B1 is engaged and released by a hydraulic servo mechanism. Specifically, there is fitted in the second center support 76 a hydraulic piston 60, to and from which the oil is fed and discharged through another oil passage (although not shown) formed to extend through the second center support 76 from the outer surface thereof. Moreover, a return spring 63 for moving the hydraulic piston 60 backward is arranged in front of the hydraulic piston 60.

On the other hand, the center planetary gear set 2 and the rear planetary gear set 3 are arranged subsequent to the first brake means B1 and the one-way clutch F1. The center planetary gear set 2 has its carrier 2C connected and splined to the first sun gear shaft 72 and its ring gear 2R connected to the carrier 3C of the rear planetary gear set 3. These ring gear 2R and carrier 3C are connected to the output shaft 5 which is arranged on the extension of the aforementioned intermediate shaft 74.

Even the automatic transmission shown in FIGS. 2(A) and 2(B) can also set the five forward and one reverse gears, as enumerated in Table 2. In this Table: symbol O indicates the engaged state during an engine braking; symbol Δ indicates the permission of engagement; and the residuals are similar to those of Table 1.

TABLE 2

| | Clutch Means | | | | | Brake | One-Way Clutch | | |
|---|---|---|---|---|---|---|---|---|---|
| | K1 | K2 | K3 | K4 | K5 | B2 | F1 | F2 | F3 |
| 1st | O | X | X | ⊙ | X | ⊙ | X | O | O | X |
| 2nd | O | ⊙ | X | X | O | ⊙ | X | O | X | O |
| 3rd | O | X | O | X | Δ | ⊙ | X | O | X | X |
| 4th | Δ | ⊙ | O | ⊙ | O | X | X | X | O | O |
| 5th | X | ⊙ | O | X | O | X | O | X | X | O |
| Rev | X | X | O | O | Δ | O | X | Δ | Δ | X |

As is now apparent from FIGS. 2(A) and 2(B), therefore, the first and third clutch means K1 and K3 acting as the input clutch means are arranged at the side of the input shaft 4 with respect to the front planetary gear set 1, and the second and fourth clutch means K2 and K4 connected to that third clutch means K3 are arranged at the opposite side to the input shaft 4 with respect to the front planetary gear set 1. What extends around the ring gear 1R of the front planetary gear set 1 is the quill shaft Qs, i.e., the aforementioned connecting drum 34. On the other hand, the second clutch means K2 and the fourth clutch means K4 are disposed at the same side as the first brake means B1 with respect to the center planetary gear set 2, and the fourth clutch means K4 is disposed closer to the center planetary gear set 2 than the second clutch means K2, so that no rotating member exists radially outside of those clutch means K2 and K4. As a result, the clutch means K2 and K4 have their external diameters retained at the necessary values without being especially restricted while their axial lengths shortened. Moreover, the feed and discharge of the oil pressure to the hydraulic servo sets for actuating those clutch means K2 and K4 can be accomplished from the outside of their outer surfaces so that the oil passage structures can be simplified. Since, moreover, the external diameters of the clutch means K2 and K4 are not restricted but can be equalized to share the parts for the clutch means such as the clutch drums and discs and the accompanying hydraulic servo sets.

Incidentally, the present invention should not be limited to the embodiments thus far described but can be engaged to an automatic transmission which is equipped with another gear train constructed of a plurality of planetary gear sets, as will be exemplified in the following.

Figure 3:
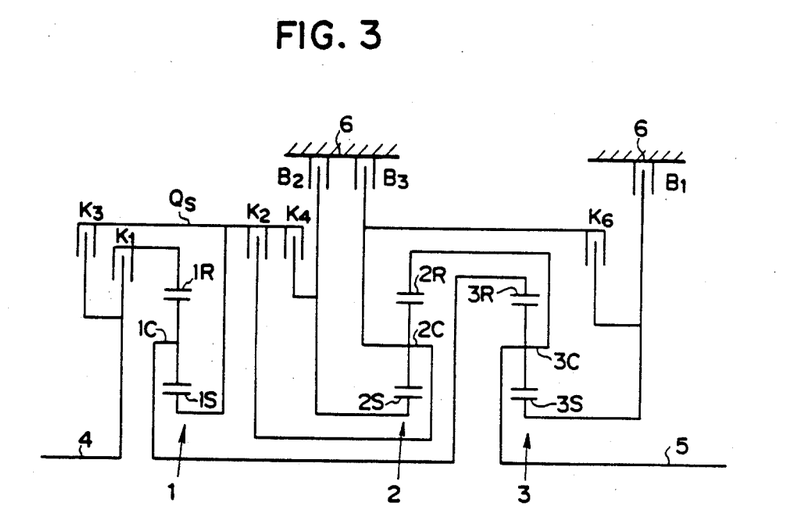
FIGS. 3 to 15 are skeleton diagrams showing the principles of other embodiments of the present invention.

The embodiment shown in FIG. 3 is constructed such that the brake means for braking the carrier 2C of the center planetary gear set 2 of the structure of FIG. 1 selectively is exemplified by third brake means B3, such that the first brake means B1 brakes the sun gear 3S of the rear planetary gear set 3 by itself, and such that sixth clutch means K6 is interposed between the carrier 2C of the center planetary gear set 2 and the sun gear 3S of the rear planetary gear set 3. In this structure, too, the first and third clutch means K1 and K3 acting as the input clutch means are disposed at the side of the input shaft 4 with respect to the front planetary gear set 1, and the second and fourth clutch means K2 and K4 are arranged at the opposite side to the input shaft 4 with respect to the front planetary gear set 1, so that the quill shaft Qs extending around the front planetary gear set 1 can be restricted to one. Moreover, the second and fourth clutch means K2 and K4 are arranged at the same side as that of the third brake means B3 for braking the carrier 2C of the center planetary gear set 2 selectively, and the fourth clutch means K4 is arranged at the side of the center planetary gear set 2 with respect to the second clutch means K2, so that advantages similar to those of the foregoing embodiment can be attained. With this structure, still moreover, the carrier 2C of the center planetary gear set 2 can be prevented from rotating unnecessarily. Table 3 enumerates the operations of the automatic transmission having the structure shown in FIG. 3.

TABLE 3

|  | Clutch Means | | | | | Brake Means | | |
| --- | --- | --- | --- | --- | --- | --- | --- | --- |
|  | K1 | K2 | K3 | K4 | K6 | B1 | B2 | B3 |
| 1st | O | X | X | O | X* | O* | X | O* |
| 2nd | O | X* | X | O* | X* | O | O* | X |
| 3rd | O | X* | O | O* | X* | O* | X* | X* |
| 4th | O* | O* | O* | O* | O | X* | X* |  |
| 5th | X* | O | O | X | O* | X* | O | X* |
| Rev | X | X | O | O | X* | O* | X | O* |

(*):The engaged and released stated of those clutch means should not be limited to those, as tabulated, but the corresponding gears can be set by another combination.

Figure 4:
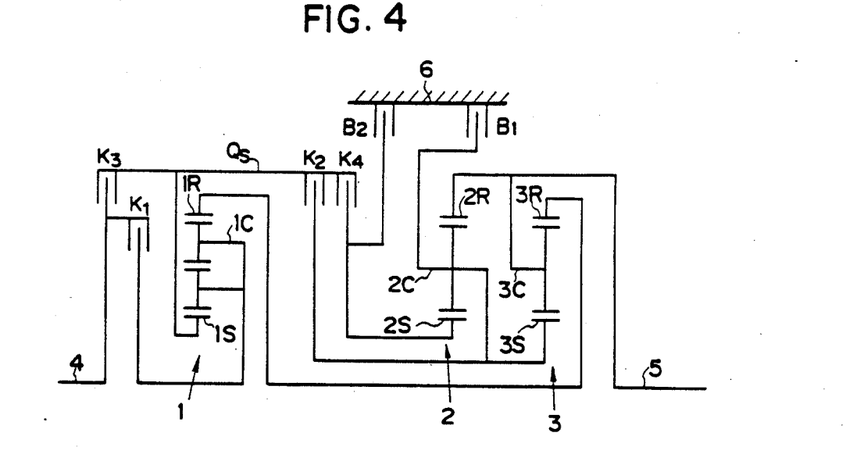

The automatic transmission shown in FIG. 4 is constructed such that the front planetary gear set 1 of the structure of FIG. 1 is replaced by a double-pinion type planetary gear set so that the front planetary gear set 1 has its ring gear 1R integrally connected to the ring gear 3R of the rear planetary gear set 3 and its sun gear 1S connected to selectively to the input shaft 4 by the third clutch means K3. The remaining structural components are similar to those of the embodiment shown in FIG. 1. The operations of the automatic transmission shown in FIG. 4 are enumerated in Table 4.

TABLE 4

|  | Clutch Means | | | | Brake Means | |
| --- | --- | --- | --- | --- | --- | --- |
|  | K1 | K2 | K3 | K4 | B1 | B2 |
| 1st | O | X | X | O | O | X |
| 2nd | O | O | X | X | O | X |
| 3rd | O | X | O | X | O | X |
| 4th | O* | O* | O* | O* | X | X |
| 5th | X | O | O | X | X | O |
| Rev | X | X | O | O | O | X |

(*):At least any three clutch means are engaged.

Figure 5:
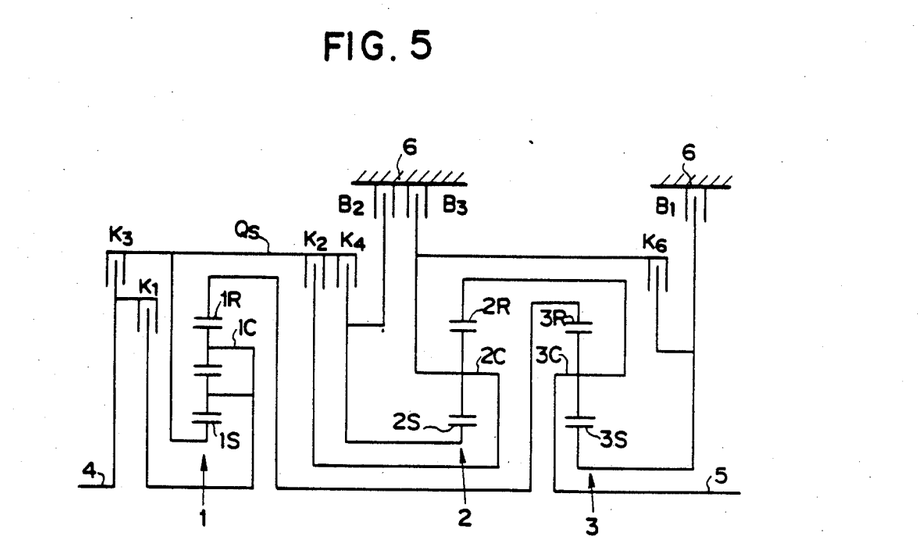

On the other hand, the automatic transmission shown in FIG. 5 is constructed such that the front planetary gear set 1 having the structure of FIG. 3 is replaced by a double-pinion type planetary gear set so that the front planetary gear set 1 has its ring gear 1R integrally connected to the ring gear 3R of the front planetary gear set 3 and its sun gear 1S connected selectively to the input shaft by the third clutch means K3. The remaining structural components are similar to those of the embodiment of FIG. 3. The operations of the automatic transmission shown in FIG. 5 are enumerated in Table 5.

TABLE 5

|  | Clutch Means | | | | | Brake Means | | |
| --- | --- | --- | --- | --- | --- | --- | --- | --- |
|  | K1 | K2 | K3 | K4 | K6 | B1 | B2 | B3 |
| 1st | O | X | X | O | X* | O* | X | O* |
| 2nd | O | X* | X | O* | X* | O | O* | X |
| 3rd | O | X* | O | O* | X* | O* | X* | X* |
| 4th | O* | O* | O* | O* | O* | X | X* | X* |
| 5th | X* | O | O | X | O* | X* | O | X* |
| Rev | X | X | O | O | X* | O | X* | O* |

(*):The engaged and released states of those clutch means and brake means should not be limited to those, as tabulated, but the corresponding gears can be set by another combination.

Figure 6:
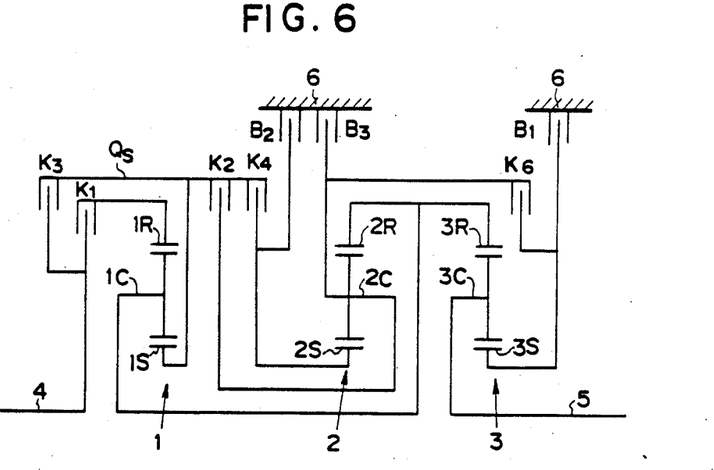

Another embodiment shown in FIG. 6 is modified from the foregoing structure of FIG. 3 is modified in the connection between the components of the center planetary gear set 2 and the components of the rear planetary gear set 3. Specifically, the ring gear 2R of the center planetary gear set 2 and the ring gear 3R of the rear planetary gear set 3 are integrally connected so that the carrier 1C of the front planetary gear set 1 is integrally connected to those ring gears 2R and 3R. The remaining structural components are similar to those shown in FIG. 3. The operations are enumerated in FIG. 6.

TABLE 6

|  | Clutch Means | | | | | Brake Means | | |
| --- | --- | --- | --- | --- | --- | --- | --- | --- |
|  | K1 | K2 | K3 | K4 | K6 | B1 | B2 | B3 |
| 1st | O | X | X | O | O* | O* | X | O* |
| 2nd | O | X*1 | X | O*1 | X*1 | O*1 | O*1 | X*1 |
| 3rd | O | X*1 | O | O*1 | X*1 | O | X*1 | X*1 |
| 4th | O*2 | O*2 | O*2 | O*2 | O*2 | X | X | X |
| 5th | X | O | O | X | O | X | O | X |
| Rev | X | X | O | O | X* | O* | X | O* |

(*):At least two may be engaged.
(*1):The engaged and released states of those clutch means and brake means should not be limited to those, as tabulated, but the corresponding gears can be set by another combination.
(*2):Either at least three of K1 to K3 or at least four of K1 to K6 may be engaged. In the casing of the change between 3rd and 4th gears, K2 is released whereas K4 is engaged. In the case of the change between 4th and 5th gears, K2 is engaged whereas K4 is released.

Figure 7:
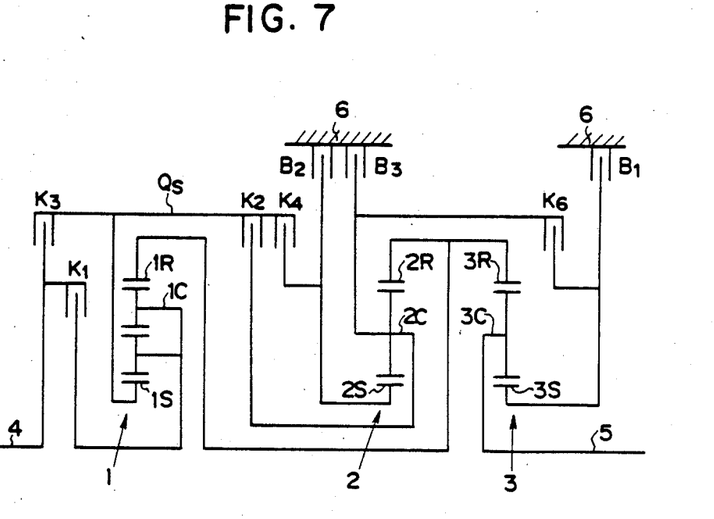

Another embodiment shown in FIG. 7 is made by modifying the structure of FIG. 5 as in the case of the structure of FIG. 6 coming from that of FIG. 3. In the structure shown in FIG. 7, the ring gears 2R and 3R of the center and rear planetary gear sets 2 and 3 of the structure of FIG. 5 are connected to each other so that the ring gear 1R of the front planetary gear set 1 is integrally connected to those two ring gears 2R and 3R. The operations are enumerated in Table 7.

TABLE 7

|  | Clutch Means | | | | | Brake Means | | |
| --- | --- | --- | --- | --- | --- | --- | --- | --- |
|  | K1 | K2 | K3 | K4 | K6 | B1 | B2 | B3 |
| 1st | O | X | X | O | X* | O* | X | O* |
| 2nd | O | X* | X | O* | X* | O* | O* | X* |
| 3rd | O | X* | O | O* | X* | O | X* | X* |
| 4th | O* | O* | O* | O* | O* | X | X | X |
| 5th | X | O | O | X | O | X | O | X |
| Rev | X | X | O | O | X* | O* | X | O* |

(*):The engaged and relased states of those clutch means should not be limited to those, as tabulated, but the corresponding gears can be set by another combination.

Figure 8:
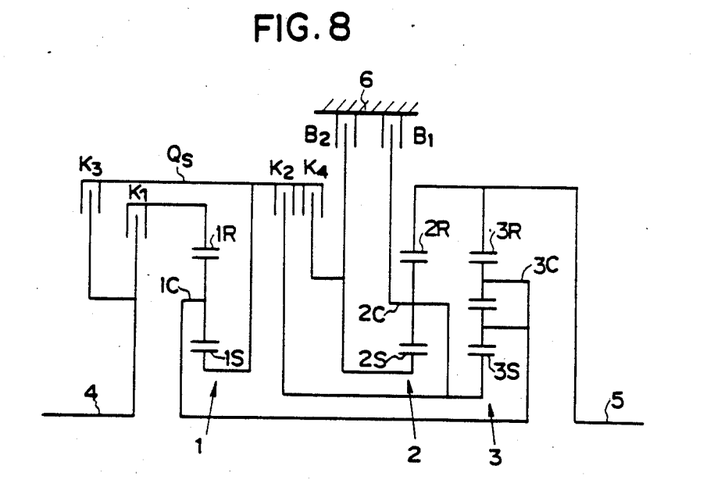

Another embodiment shown in FIG. 8 is modified from the foregoing structure of FIG. 1 such that the rear planetary gear set 3 is changed from the single-pinion type to a double-pinion type so that the carrier 1C of the front planetary gear set 1 is connected to the carrier 3C of the rear planetary gear set 3, and such that the ring gear 2R of the center planetary gear set 2 and the ring gear 3R of the rear planetary gear set 3 are connected to each other and to the output shaft 5. The remaining structural components are similar to those of FIG. 1. This structure can also can set the five forward and one reverse gears and has the same operations as those of Table 1.

Figure 9:
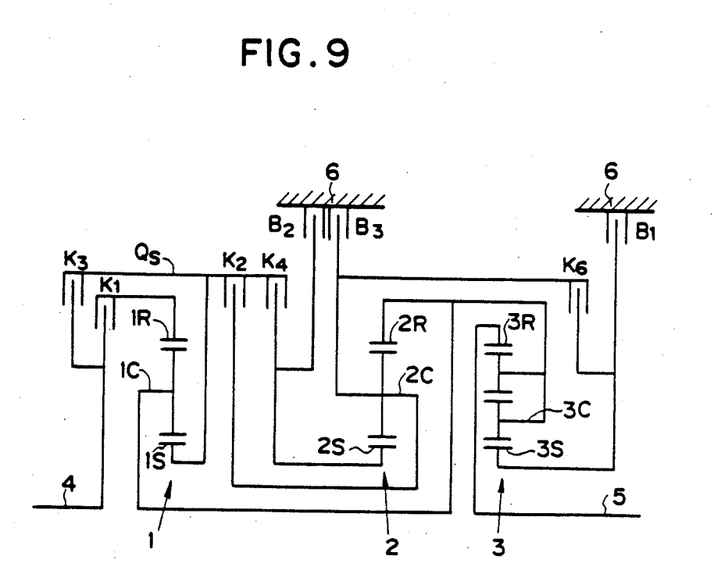

Another embodiment shown in FIG. 9 is modified from the foregoing structure of FIG. 3 such that the rear planetary gear set 3 is changed from the single-pinion type to a double-pinion type so that the carrier 1C of the front planetary gear set 1 is integrally connected to the ring gear 2R of the center planetary gear set 2 and the carrier 3C of the rear planetary gear set 3, which in turn are connected to each other, and such that the output shaft 5 is connected to the ring gear 3R of the rear planetary gear set 3. The remaining structural components are similar to those of the embodiment shown in FIG. 3. The operations are similar to those enumerated in Table 6.

In the embodiments thus far described with reference to FIGS. 3 to 9, too, the first and third clutch means K1 and K3 acting as the input clutch means are arranged at the side of the input shaft 4 with respect to the front planetary gear set 1, and the second and fourth clutch means K2 and K4 connected to the third clutch means K3 are arranged at the opposite side to the input shaft 4 with respect to the front planetary gear set 1. As a result, the quill shaft Qs extending around the ring gear 1R of the front planetary gear set 1 is only one, i.e., the aforementioned connecting drum 34. Moreover, the brake means B1 or B3 connected to the carrier 2C of the center planetary gear set 2 and the second and fourth clutch means K2 and K4 are arranged at one side with respect to the center planetary gear set 2, and the fourth clutch means K2 connected to the sun gear 2S is arranged closer to the center planetary gear set 2 than the second clutch means K2 connected to the carrier 2C. As a result, the external diameters of those clutch means K2 and K4 are not especially limited, but the advantages obtainable can be similar to those of the automatic transmission having the structure shown in FIG. 1 and FIGS. 2(A) and 2(B).

Figure 10:
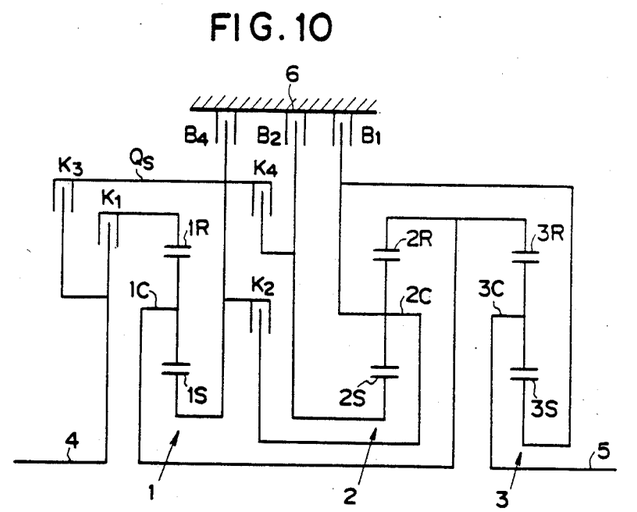

Another embodiment shown in FIG. 10 is modified from the aforementioned structure of FIG. 6 such that the carrier 2C of the center planetary gear set 2 is integrally connected to the sun gear 3S of the rear planetary gear set 3, such that there is provided the first brake means B1 for braking those carrier 2C and sun gear 3S to the casing 6, and such that there is provided the fourth brake means B4 for braking the sun gear 1S of the front planetary gear set 1 to the casing 6. The remaining structural components are similar to those of FIG. 6. The operations are enumerated in Table 8.

TABLE 8

| | Clutch Means | | | | Brake Means | | |
|---|---|---|---|---|---|---|---|
| | K1 | K2 | K3 | K4 | B1 | B4 | B2 |
| 1st | O | X | X | O | O | X | X |
| 2nd | O | X* | X | X | O* | O* | X |
| 3rd | O | X | O | X | O | X | X |
| 4th | O*1 | O*1 | O*1 | O*1 | X | X | X |
| 5th | X | O | O | X | X | X | O |
| Rev | X | X | O | O | O | X | X |

(*):At least any two clutch means are engaged.
(*1):At least any three clutch means are engaged.

Figure 11:
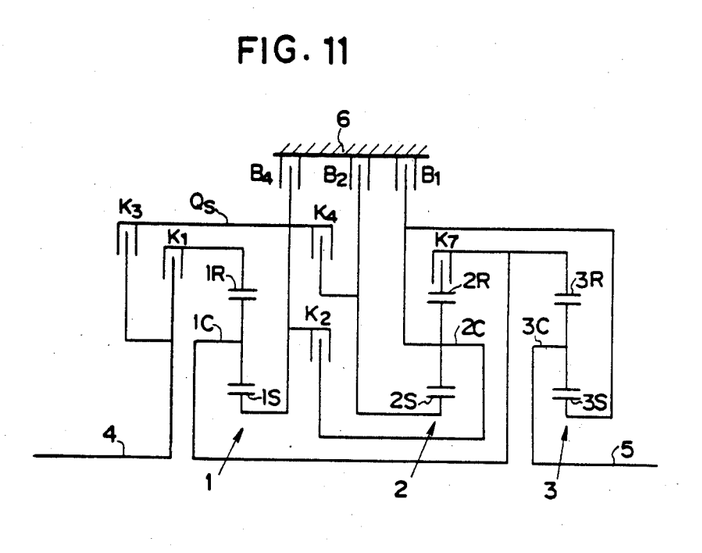

Another embodiment shown in FIG. 11 is modified from the structure of FIG. 10 by providing seventh clutch means K7 for connecting the ring gear 2R of the center planetary gear set 2 to the ring gear 3R of the rear planetary gear set 3 and the carrier 1C of the front planetary gear set 1. The operations are enumerated in Table 9.

TABLE 9

| | Clutch Means | | | | | Brake Means | | |
|---|---|---|---|---|---|---|---|---|
| | K1 | K2 | K3 | K4 | K7 | B1 | B4 | B2 |
| 1st | | X | X | O | O | O | X | X |
| 2nd | O | X* | X | O* | X* | O* | O* | X* |
| 3rd | O | X | O | O*1 | X*1 | O | X | X |
| 4th | O*2 | O*2 | O*2 | O*2 | O*2 | X | X | X |
| 5th | X | O | O | X | O | X | X | O |

TABLE 9-continued

| | Clutch Means | | | | | Brake Means | | |
|---|---|---|---|---|---|---|---|---|
| | K1 | K2 | K3 | K4 | K7 | B1 | B4 | B2 |
| Rev | X | X | O | O | O | O | X | X |

(*):The engaged and released states of those clutch means and brake means should not be limited to those, as tabulated, but the corresponding gears can be set by another combination.
(*1):Either one may be engaged.
(*2):Either at least three of K1 to K3 or at least four of K1 to K6 may be engaged. In the casing of the change between 3rd and 4th gears, K2 is released whereas K4 is engaged. In the case of the change between 4th and 5th gears, K2 is engaged whereas K4 is released.

Figure 12:
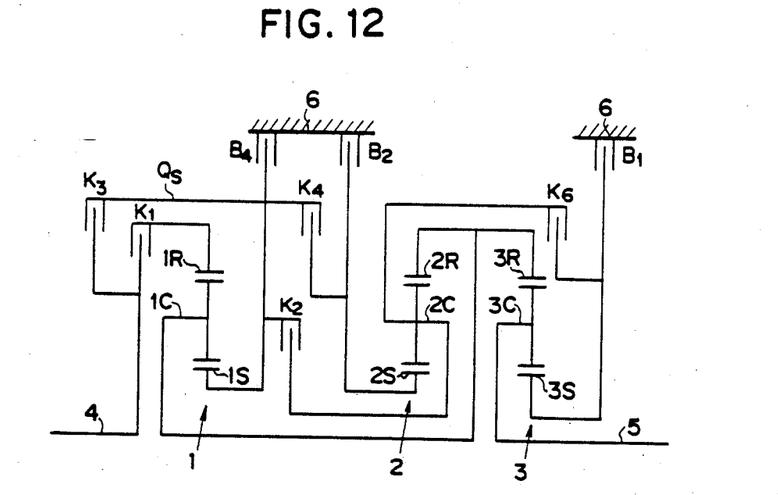

Another embodiment shown in FIG. 12 has a structure similar to that of FIG. 6 excepting that the aforementioned third brake means B3 of FIG. 6 is eliminated and that there is provided the fourth brake means B4 for braking the sun gear 1S of the front planetary gear set 1 to the casing 6. The operations are enumerated in Table 10.

TABLE 10

| | Clutch Means | | | | | Brake Means | | |
|---|---|---|---|---|---|---|---|---|
| | K1 | K2 | K3 | K4 | K6 | B1 | B4 | B2 |
| 1st | O | X | X | O | O | O | X | X |
| 2nd | O | X* | X | O* | X* | O* | O* | X* |
| 3rd | O | X | O | O*1 | X*1 | O | X | X |
| 4th | O*2 | O*2 | O*2 | O*2 | O*2 | X | X | X |
| 5th | X | O | O | X | O | X | X | O |
| Rev | X | X | O | O | O | O | X | X |

(*):The engaged and released states of those clutch means and brake means should not be limited to those, as tabulated, but the corresponding gears can be set by another combination.
(*1):Either one may be engaged.
(*2):Either at least three of K1 to K3 or at least four of K1 to K6 may be engaged. In the casing of the change between 3rd and 4th gears, K2 is released whereas K4 is engaged. In the case of the change between 4th and 5th gears, K2 is engaged whereas K4 is released.

Figure 13:
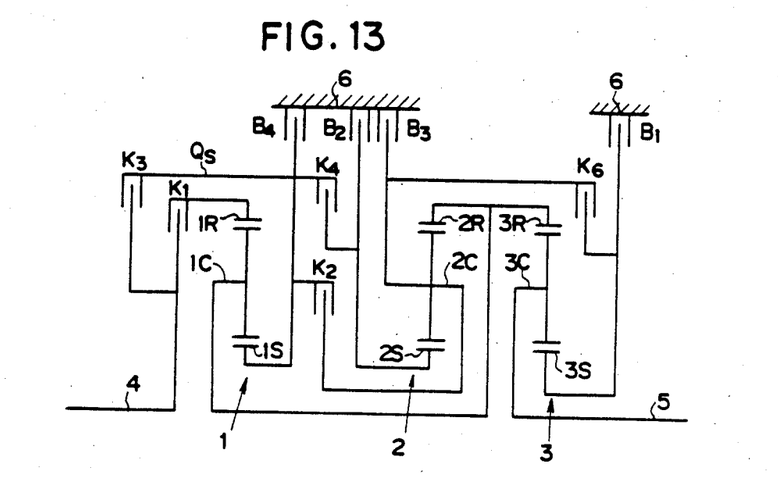

Another embodiment shown in FIG. 13 is modified from the aforementioned structure of FIG. 6 by additionally providing the fourth brake means B4 for braking the sun gear 1S of the front planetary gear set 1 to the casing 6. The operations are enumerated in Table 11.

TABLE 11

| | Clutch Means | | | | | Brake Means | | | |
|---|---|---|---|---|---|---|---|---|---|
| | K1 | K2 | K3 | K4 | K6 | B1 | B4 | B2 | B3 |
| 1st | O | X | X | O | X* | O* | X | X | O* |
| 2nd | O | X*1 | X | O*1 | X*1 | O*1 | O*1 | X*1 | X*1 |
| 3rd | O | X | O | O*2 | X*2 | O | X | X | X |
| 4th | O* | O* | O* | O* | O* | X | X | X | X |
| 5th | X | O | O | X | O | X | X | O | X |
| Rev | X | X | O | O | X* | O* | X | X | O* |

(*):Any two or more may be engaged.
(*1):The engaged and released states of those clutch means and brake means should not be limited to those, as tabulated, but the corresponding gears can be set by another combination.
(*2):Either one may be engaged.
(*3):Either at least three of K1 to K3 or at least four of K1 to K6 may be engaged. In the casing of the change between 3rd and 4th gears, K2 is released whereas K4 is engaged. In the case of the change between 4th and 5th gears, K2 is engaged whereas K4 is released.

Figure 14:
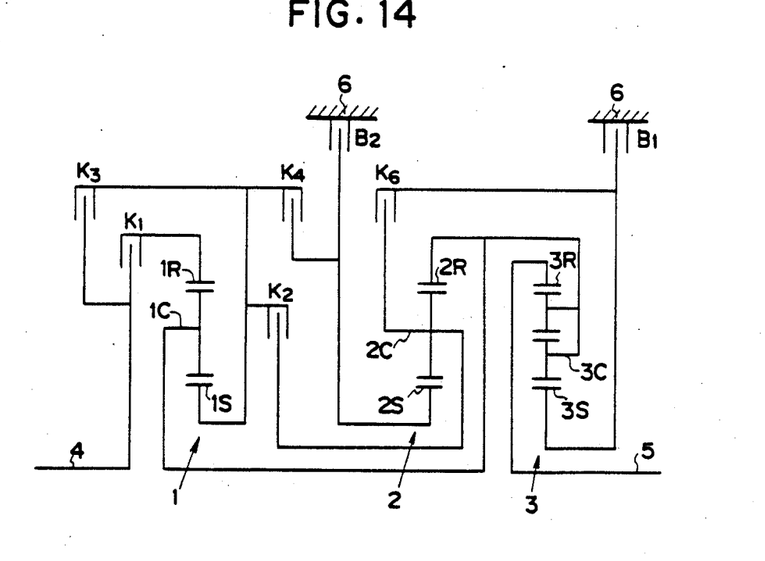

Another embodiment shown in FIG. 14 is modified from the structure of FIG. 9 such that the third brake means B3 is eliminated. The operations are enumerated in Table 12.

TABLE 12

| | K1 | K2 | K3 | K6 | K4 | B1 | B2 |
|---|---|---|---|---|---|---|---|
| 1st | O | X | X | O | O | O | X |
| 2nd | O | X | X | X | O | O | |
| 3rd | O | X | O | X | O | O | X |
| 4th | O | O* | O | O | O | X | X |

TABLE 12-continued

|     | K1 | K2 | K3 | K6 | K4 | B1 | B2 |
|-----|----|----|----|----|----|----|----|
| 5th | X  | ○  | ○  | ○  | X  | X  | ○  |
| Rev | X  | X  | ○  | ○  | ○  | ○  | X  |

(*):May be engaged.

Figure 15:
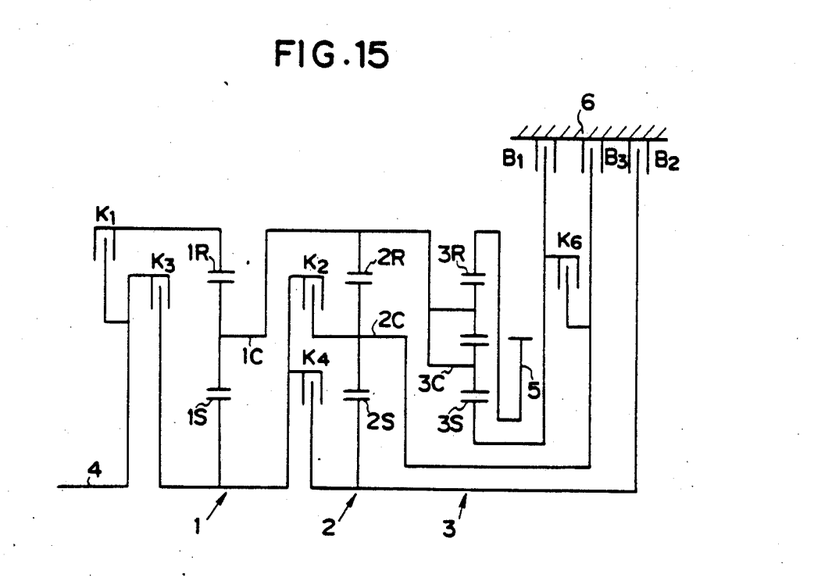

Another embodiment shown in FIG. 15 is a modification, in which the connection relations the individual rotating components of the aforementioned planetary gear sets 1, 2 and 3 and the individual clutch and brake means are differently arranged while keeping their connection relations unchanged. Specifically, the individual planetary gear sets 1, 2 and 3 and the first to fourth clutch means K1, K2, K3 and K4 are arrayed like FIG. 9. On the contrary, however, the output shaft 5 is formed into a cylindrical member and arranged at the opposite side to the center planetary gear set 2 across the rear planetary gear set 3. Moreover, the first to third brake means B1, B2 and B3 and the sixth clutch means K6 are arranged at the opposite side to the rear planetary gear set 3 across the aforementioned output shaft 5. In the automatic transmission shown in FIG. 15, therefore, the output shaft 5 is positioned near the axial center so that this structure can find its suitable application in a vehicle having its (not-shown) engine mounted transversely.

In the individual embodiments shown in FIGS. 1 and 3 to 15, on the other hand, the individual engagement means are symbolically indicated by the multidisc clutches or brakes. As the specific embodiment of FIG. 1 is shown in FIGS. 2(A) and 2(B), each engagement means can be constructed by combining the one-way clutch and the multi-disc clutch or brake or the band brake. More specifically, the structure to be adopted can be found in the Specification and Drawings attached to our Japanese patent applications Nos. 63-176270 and 63-221670.

Moreover, the present invention can be engaged not only to the automatic transmission which is suited for an FR (i.e., front-engine and rear-drive) vehicle by arranging the input shaft 4 and the output shaft 5 coaxially but also to the automatic transmission which is suited for an FF (i.e., front-engine and front-drive) vehicle by arranging the output shaft in parallel with the input shaft.

Still moreover, the present invention can be enganoged only to an automatic transmission adapted to set the five forward and one reverse gears by using the three planetary gear sets but also widely to an automatic transmission including a plurality planetary gear sets having their components connected so that it may set a plurality of gears.

The advantages to be obtained by the present invention will be generally described in the following. In the automatic transmission of the present invention, it is sufficient to provide only one connecting quill shaft extending around the planetary gear set adjacent to the input shaft. As a result, the size of the external diameter can be reduced, and the structure for arranging the individual components and the structure for the oil passages can be simplified. Since, moreover, the structural members of the planetary gear sets and the clutch means for connecting the former to other members are arranged close to each other to shorten their connecting shafts so that the structure can be further made simple and light. After all, according to the present invention, it is possible to provide compact an automatic transmission for setting a plurality of gears by using a plurality of planetary gear sets.

What is claimed is:

1. An automatic transmission including gear trains, which are constructed of at least three planetary gear sets each having three rotating members, i.e., a sun gear, a carrier and a ring gear for changing the speeds of the rotations of an input shaft and transmitting the same to an output shaft, the first and second ones of said three planetary gear sets being arranged adjacent to and at an extension of the axis of said input shaft, comprising:

first clutch means arranged closer to said input shaft than said first planetary gear set for connecting any one of the rotating members of said first planetary gear set arranged adjacent to said input shaft;

second clutch means arranged closer to said input shaft than said first planetary gear set for connecting another of the rotating members of said first planetary gear set and said input shaft;

third clutch means interposed between said first planetary gear set and said second planetary gear set for connecting any one of the rotating members of said second planetary gear set arranged at the opposite side to said input shaft across said first planetary gear set and said any one or said another of the rotating members of either one of said first clutch means and said second clutch means or said first planetary gear set; and fourth clutch means interposed between said first planetary gear set and said second planetary gear set for connecting said another of the rotating members of said second planetary gear set and said any one or said another of the rotating members of said first clutch means, said second clutch means or said first planetary gear set.

2. An automatic transmission according to claim 1, wherein said gears are at least five forward and one reverse speed.

3. An automatic transmission according to claim 1, wherein said first planetary gear set, said second planetary gear set and said third planetary gear set are arrayed sequentially and coaxially from the side of said input shaft.

4. An automatic transmission according to claim 3, wherein said output shaft is arranged at the opposite side to and on a common axis with said input shaft across said planetary gear sets arrayed coaxially.

5. An automatic transmission according to claim 3, wherein each of said planetary gear sets is of the single-pinion type having a pinon meshing with the sun gear and ring gear thereof.

6. An automatic transmission according to claim 5, wherein said first clutch means is adapted to connect the ring gear of said first planetary gear set and said input shaft selectively, wherein said second clutch means is adapted to connect the sun gear of said first planetary gear set and said input shaft selectively, wherein said third clutch means is adapted to connect the carrier of said second planetary gear set and said second clutch means or the sun gear of said first planetary gear set, and wherein said fourth clutch means is adapted to connect the sun gear of said second planetary gear set and said second clutch means or the sun gear of said first planetary gear set.

7. An automatic transmission according to claim 6, further comprising:

a casing accommodating said gear trains;

first brake means for braking the carrier of said second planetary gear set to said casing; and
second brake means for braking the sun gear of said second planetary gear set to said casing,
wherein the ring gear of said second planetary gear set and the carrier of said third planetary gear set are connected to each other and said output shaft, wherein the carrier of said second planetary gear set and the sun gear of said third planetary gear set are connected to each other, and wherein the carrier of said first planetary gear set and the ring gear of said third planetary gear set are connected to each other.

8. An automatic transmission according to claim 7, wherein said first brake means and said second brake means are interposed between said first planetary gear set and said second planetary gear set.

9. An automatic transmission according to claim 7, further comprising:
fifth clutch means for connecting the carrier of said second planetary gear set and the sun gear of said third planetary gear set selectively; and
third brake means for braking the sun gear of said third planetary gear set to said casing.

10. An automatic transmission according to claim 6, further comprising:
a casing accommodating said gear trains;
first brake means for braking the carrier of said second planetary gear set to said casing; and
second brake means for braking the sun gear of said second planetary gear set to said casing,
wherein the ring gear of said second planetary gear set and the ring gear of said third planetary gear set are connected to each other and the carrier of said first planetary gear set, wherein the carrier of said second planetary gear set is connected to the sun gear of said third planetary gear set, and wherein said output shaft is connected to the carrier of said third planetary gear set.

11. An automatic transmission according to claim 10, further comprising:
fifth clutch means for connecting the carrier of said second planetary gear set and the sun gear of said third planetary gear set selectively; and
third brake means for braking the sun gear of said third planetary gear set to said casing.

12. An automatic transmission according to claim 10, further comprising: fourth brake means for braking the sun gear of said first planetary gear set to said casing.

13. An automatic transmission according to claim 10, further comprising sixth clutch means for connecting the ring gear of said second planetary gear set to the carrier of said first planetary gear set and the ring gear of said third planetary gear set.

14. An automatic transmission according to claim 6, further comprising:
a casing accommodating said gear trains;
second brake means for braking the sun gear of said second planetary gear set to said casing;
third brake means for braking the sun gear of said third planetary gear set to said casing;
fourth brake means for braking the sun gear of said first planetary gear set to said casing; and
fifth clutch means for connecting the carrier of said second planetary gear set and the sun gear of said third planetary gear set,
wherein the ring gear of said second planetary gear set and the ring gear of said third planetary gear set are connected to each other and the carrier of said first planetary gear set, and wherein said output shaft is connected to the carrier of said third planetary gear set.

15. An automatic transmission according to claim 14, further comprising first brake means for braking the carrier of said second planetary gear set to said casing.

16. An automatic transmission according to claim 3, wherein said first planetary gear set is of the double-pinion type in which at least one pinion meshing with each other are interposed between said sun gear and said ring gear thereof, and wherein each of said second and third planetary gear sets is of the single-pinion type having a pinion meshing with the sun gear and ring gear thereof.

17. An automatic transmission according to claim 16, wherein said first clutch means is adapted to connect said input shaft and the carrier of said first planetary gear set selectively, wherein said second clutch means is adapted to connect said input shaft and the sun gear of said first planetary gear set selectively, wherein said third clutch means is adapted to connect the carrier of said second planetary gear set and said second clutch means or the sun gear of said first planetary gear set, and wherein said fourth clutch means is adapted to connect the sun gear of said second planetary gear set and said clutch means or the sun gear of said first planetary gear set.

18. An automatic transmission according to claim 17, further comprising:
a casing accommodating said gear trains;
first brake means for braking the carrier of said second planetary gear set to said casing; and
second brake means for braking the sun gear of said second planetary gear set to said casing,
wherein the ring gear of said second planetary gear set and the carrier of said third planetary gear set are connected to each other other and said output shaft, and wherein the carrier of said second planetary gear set and the sun gear of said third planetary gear set are connected to each other and the ring gear of said first planetary gear set.

19. An automatic transmission according to claim 18, wherein said first brake means and said second brake means are interposed between said first planetary gear set and said second planetary gear set.

20. An automatic transmission according to claim 18, further comprising:
fifth clutch means for connecting the carrier of said second planetary gear set and the sun gear of said third planetary gear set; and
third brake means for braking the sun gear of said third planetary gear set to said casing.

21. An automatic transmission according to claim 17, further comprising:
a casing accommodating said gear trains;
first brake means for braking the carrier of said second planetary gear set to said casing;
second brake means for braking the sun gear of said second planetary gear set to said casing;
third brake means for braking the sun gear of said second planetary gear set to said casing; and
fifth clutch means for connecting the carrier of said second planetary gear set selectively to the sun gear of said third planetary gear set,
wherein the ring gears of said planetary gear sets are connected to each other, and wherein said output shaft is connected to the carrier of said third planetary gear set.

22. An automatic transmission according to claim 3, wherein each of said first planetary gear set and said second planetary gear set is of the single-pinion type having a pinion meshing with the sun gear and ring gear thereof, and wherein said third planetary gear set is of the double-pinion type in which at least one pair of pinions meshing with each other are interposed between the sun gear and the ring gear thereof.

23. An automatic transmission according to claim 22, wherein said first clutch means is adapted to connect said input shaft and the ring gear of said first planetary gear set selectively, wherein said second clutch means is adapted to connect said input shaft and the sun gear of said first planetary gear set selectively, wherein said clutch means is adapted to connect the carrier of said second planetary gear set and said clutch means or the sun gear of said first planetary gear set, and wherein said fourth clutch means is adapted to connect the sun gear of said second planetary gear set and said second clutch means or the sun gear of said first planetary gear set.

24. An automatic transmission according to claim 23, further comprising:
a casing accommodating said gear trains;
first brake means for braking the carrier of said second planetary gear set to said casing; and
second brake means for braking the sun gear of said second planetary gear set to said casing;
wherein the ring gear of said second planetary gear set and the ring gear of said third planetary gear set are connected to each other and said output shaft, wherein the carrier of said second planetary gear set and the sun gear of said third planetary gear set are connected to each other, and wherein the carrier of said first planetary gear set and the carrier of said third planetary gear set are connected to each other.

25. An automatic transmission according to claim 24, wherein said first brake means and said second brake means are interposed between said first planetary gear set and said second planetary gear set.

26. An automatic transmission according to claim 23, further comprising:
a casing accommodating said gear trains;
first brake means for braking the carrier of said second planetary gear set to said casing;
second brake means for braking the sun gear of said second planetary gear set to said casing;
third brake means for braking the sun gear of said third planetary gear set to said casing; and
fifth clutch means for connecting the carrier of said second planetary gear set selectively to the sun gear of said third planetary gear set,
wherein the ring gear of said second planetary gear set and the carrier of said third planetary gear set are connected to each other and the carrier of said first planetary gear set, and wherein said output shaft is connected to the ring gear of said third planetary gear set.

27. An automatic transmission according to claim 23, further comprising:
a casing accommodating said gear trains;
second brake means for braking the sun gear of said second planetary gear set to said casing;
third brake means for braking the sun gear of said third planetary gear set to said casing; and
fifth clutch means for connecting the carrier of said second planetary gear set and the sun gear of said third planetary gear set selectively,
wherein the ring gear of said second planetary gear set and the carrier of said third planetary gear set are connected to each other and the carrier of said first planetary gear set, and wherein said output shaft is connected to the ring gear of said third planetary gear set.

28. An automatic transmission according to claim 27, further comprising first brake means for braking the sun gear of said second planetary gear set to said casing.

29. An automatic transmission according to claim 28, further comprising sixth clutch means for connecting the carrier of said first planetary gear set to the ring gear of said second planetary gear set and the carrier of said third planetary gear set.

30. An automatic transmission according to claim 28, wherein said output shaft is formed into a cylindrical shape and is arranged at the opposite side to said second planetary gear set across said third planetary gear set, and wherein said first brake means, said second brake means, said third brake means and said sixth clutch means are arranged at the opposite side to said third planetary gear set across said cylindrical output shaft.

31. An automatic transmission according to claim 1, wherein each of said first clutch means and said second clutch means includes a multi-disc clutch.

32. An automatic transmission according to claim 1, wherein said third clutch means includes: a multi-disc clutch and a one-way clutch arrayed in series with each other; and another multi-disc clutch arranged in parallel with the combination of the first-named multi-disc clutch and said one-way clutch.

33. An automatic transmission according to claim 1, wherein said fourth clutch means includes a multi-disc clutch and a one-way clutch arrayed in series with each other.

34. An automatic transmission according to claim 7, wherein said first brake means includes a multi-disc brake and a one-way clutch arranged in parallel with each other between the carrier of said second planetary gear set and said casing.

35. An automatic transmission according to claim 7, wherein said second brake means includes a band brake.

* * * * *